July 3, 1945.                H. E. SMITH                2,379,499
                              SCREEN
                        Filed Dec. 17, 1941
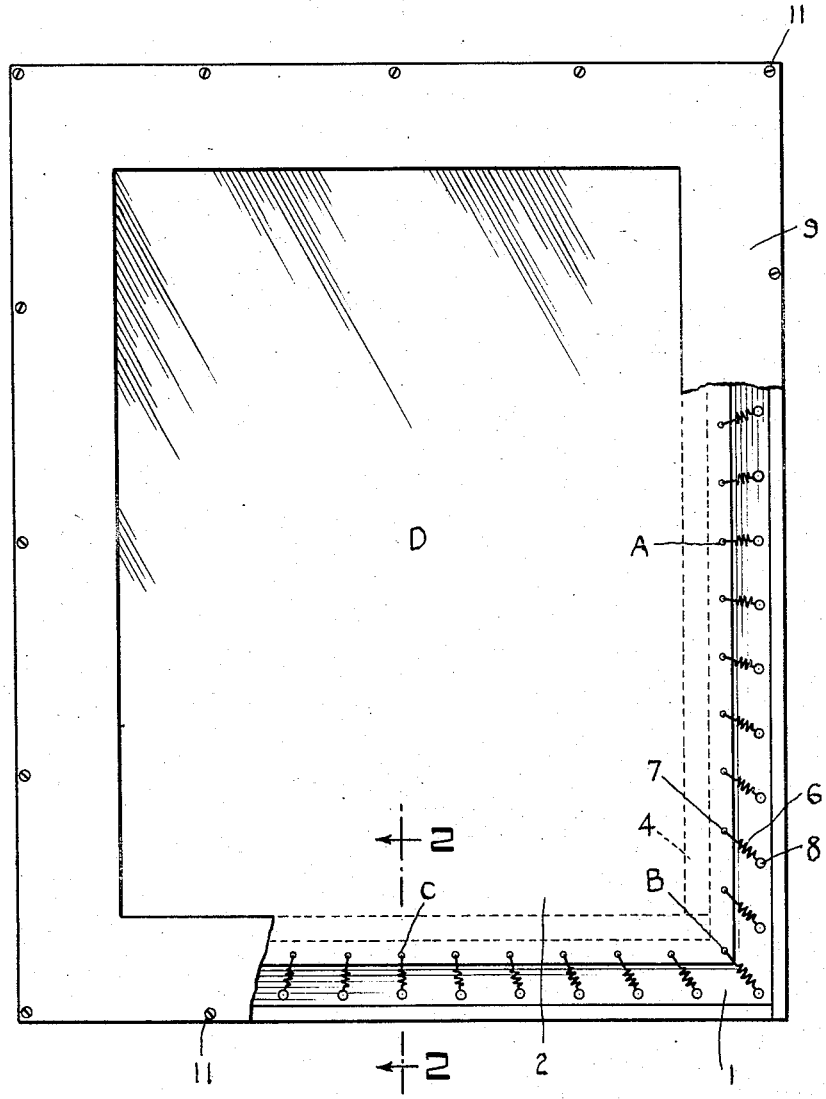
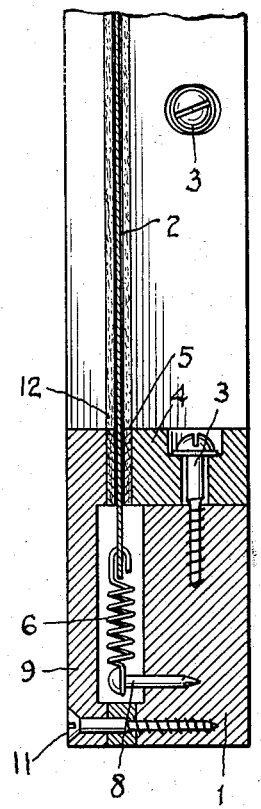
INVENTOR
Harry E. Smith Patented July 3, 1945

2,379,499

UNITED STATES PATENT OFFICE 2,379,499

SCREEN

Harry E. Smith, Little Silver, N. J., assignor to Celanese Corporation of America, a corporation of Delaware Application December 17, 1941, Serial No. 423,275

1 Claim. (Cl. 88—28.93)

This invention relates to projection screens, and relates more particularly to a novel arrangement for supporting plastic sheets employed as projection screens and the like.

Plastic sheets, such as sheets made of or containing cellulose acetate, have been employed as projection screens. Heretofore, the use of plastic sheets as projection screens was not wholly satisfactory due to the failure thereof to remain taut and smooth. Thermoplastic sheets, particularly cellulose acetate plastic sheets, are sensitive to moisture and temperature changes. The expansion and contraction of such a sheet due to such changes set up stresses and strains which are reflected in the sheet in the form of warpage and buckles. These distortions are particularly noticeable in the case where the plastic sheet is nailed or cemented rigidly at its edges to a wooden frame. If the frame carrying the plastic sheet is left in a horizontal position in humid atmosphere, the plastic sheet will expand and its weight will cause it to sag in the middle. Upon exposing this plastic sheet to a dry atmosphere, it will tend to shrink to its original dimensional stage. However, in many cases the former perfect flatness of the plastic sheet is not restored. Many attempts have been made to overcome the warping and buckling of the plastic sheet without appreciable success. For example, the plastic sheet was so suspended in its frame, as by lacing the sheet to the frame by means of elastic strings, that it was free to move around with respect to the frame, thus permitting it to expand or contract freely within the frame. This expedient, however, also failed to insure a flat sheet. Under high humidity a sheet so supported again sagged in the middle and did not flatten itself out to a smooth state upon drying and shrinking, wrinkling very perceptibly at the corners thereof.

It is an object of this invention to provide an improved arrangement for supporting a plastic sheet employed as a projection screen and the like which will be free from the above-mentioned and other disadvantages and which will be especially simple in construction and efficient in operation.

Another object of this invention is to provide a novel method of supporting a plastic sheet whereby warping and buckling thereof are prevented under atmospheric conditions.

A further object of this invention is the provision of improved means for mounting a plastic sheet in a frame so as to cause said plastic sheet to remain taut and smooth.

Other objects of this invention, together with certain details of construction and combinations of parts, will appear from the following detailed description and drawing.

Broadly, the present invention comprises the mounting of a plastic sheet in a frame, so as to maintain the sheet taut, smooth and free of any distortions, by resiliently attaching the plastic sheet to the frame in such a manner as to exert tension on the sheet in a radial direction, i. e. toward the center point of the sheet. Various tensions are placed on the sheet, depending upon the distance of the pull from the center of the sheet, the greater the distance of the pull the greater the magnitude of the pull or tension.

In the drawing, wherein the preferred embodiment of this invention is shown,

Fig. 1 is a plan view of a projection screen and a frame therefor partly broken away to show the method and means for supporting the plastic sheet on the frame, Fig. 2 is a cross-sectional view on an enlarged scale taken on line 2—2 of Fig. 1.

Like reference characters indicate like parts throughout both views of the drawing.

Referring now specifically to the drawing, the reference numeral 1 indicates the main frame, here rectangular in shape, on which the plastic sheet is supported. The inner periphery of the frame 1 has attached thereto, as by means of screws 3, a molding 4. This molding extends slightly above the upper surface of the frame and carries a felt gasket 5. The particular means for attaching plastic sheet 2 to the frame comprises resilient members such as springs 6 mounted in suitable openings or eyes 7 in the sheet 2 and on pins 8 on the frame, as will hereinafter be discussed in detail.

To cover the spring mounting of the sheet, there is provided a cap molding 9 which is adapted to be attached to the frame by means of screws 11. The inner peripheral edge extends downwardly and the face of this extension is covered with a felt gasket 12. The felt gaskets prevent small buckles which form around the edges from working towards the center or visible part of the sheet. These small buckles form around the holes 7 for a distance of several inches and are probably due to local stresses and strains caused by the eyelets or solvents used in cementing the plastic washers (not shown) to the sheets around the eyelets where sheets of small gauge are employed. In the case of heavier gauge material the local stresses and strains may be due to local tensions around the holes caused by the springs, or by the rubber bands where the latter is used. However, these buckles are rather small and appear only along the edges of the sheet and, as stated, do not extend very far into the sheet. The felt gaskets 5 and 12 are employed for controlling the buckles formed in the sheet. The clearance of the top felt gasket 12 from the plastic sheet 2 is preferably on the order of .004". The bottom felt gasket 5 is similarly placed with relation to the plastic sheet, but the total clearance of the plastic sheet between the two felt gaskets may be regulated by the loosening of the screws 11 and 3 and adjusting the positions of the moldings 4 and 9.

The springs 6 are preferably of progressively greater power from the point A in Figure 1 to the corner B and then progressively decrease in power to the point C. Thus, there is exerted upon the sheet 2 a progressively increased force from the center of the edges of the sheet to the corners. In other words, the tension of the springs increases as the distance of the pulls from the center D of the sheet becomes greater. In place of the springs 6 there may be employed elastic bands of varying diameter or power.

As stated above, the sheet 2 may be made of or contain any suitable derivative of cellulose, for example, cellulose nitrate, cellulose acetate, cellulose acetobutyrate, cellulose butyrate, ethyl cellulose, etc. However, my invention is also applicable to the use of sheets of other plastic materials, such as polymerized vinyl derivatives sold under the trade name "Vinylite," vinyl acetals sold under the trade name "Butacite," polymerized acrylic and methacrylic esters sold under the trade names "Lucite" and "Plexiglass," polymerized styrene sold under the trade name "Styron," and synthetic transparent rubbers sold under the trade names "Pliofilm" and "Koraseal." Plastic coated fabrics may also be employed as sheets in accordance with this invention. The plastic sheet employed may have one or both surfaces treated. The surface which faces the projector is treated to produce a diffusing surface on which the image is formed. It should be a surface of high diffusing power, high light transmission, low reflecting power and good surface hardness or scratch resistance. The viewing surface of the screen may be treated to eliminate reflections from external sources. The surface facing the projector may be treated by applying thereto a coating containing a derivative of cellulose, such as cellulose ether or ester of cellulose, a plasticizer, solvent and a suitable pigment with or without a dye to act as a color filter. The viewing surface may be treated by embossing thereon a pebble or fine cloth finish or it may also be coated with a derivative of cellulose in such a manner as to produce a mat or low gloss, low diffusing effect on that surface.

A preferred pigment employed in the coating on the rear surface is aluminum hydroxide. However, other pigments may be employed in lieu thereof or in addition thereto, such as titanium dioxide, finely divided silica (quartz), barytes, (barium sulphate), magnesium sulphate, zinc sulphate, gypsum (calcium sulphate), calcite, fluospar, cryolite, etc. and/or organic pigments such as cellodextrin acetate, starch, starch acetate, and cellulose esters or ethers that are insoluble in the coating solution or that are precipitated out upon drying of the coating. A typical coating composition may contain Cellulose acetate _____ 100 parts
Methyl phthalyl ethyl glycollate_____ 50 parts
Aluminum hydroxide pigment_____ 300 parts
Acetone-methyl Cellosolve _____ 50-50 mixture in a quantity sufficient for bringing the finish to a consistency suitable for spraying. One or several coats of the finish may be applied to the plastic sheet and by varying the amount of pigment different degrees of transparency of light may be obtained.

It is to be understood that the foregoing detailed description is merely given by way of illustration and that many variations may be made therein without departing from the spirit of my invention.

Having described my invention, what I desire to secure by Letters Patent is:

A picture projection screen and mounting therefor, comprising a quadrilateral frame, a plastic sheet of substantially the same configuration mounted in said frame, and means for attaching said plastic sheet to said frame, said means comprising a plurality of springs on each side of said sheet for exerting pulls of different force on said sheet in a radial direction from the center of said sheet, the springs being adapted to exert progressively increased pulls from the center of each side of said sheet towards the corners thereof.

HARRY E. SMITH.